(12) United States Patent
Lin (10) Patent No.: US 9,291,805 B1
(45) Date of Patent: Mar. 22, 2016

(54) ZOOM LENS

(71) Applicant: A-OPTRONICS TECHNOLOGY INC., Hsinchu (TW)

(72) Inventor: Chao-Hung Lin, Taipei (TW)

(73) Assignee: A-OPTRONICS TECHNOLOGY INC., Hsinchu (TW)

( * ) Notice: Subject to any disclaimer, the term of this patent is extended or adjusted under 35 U.S.C. 154(b) by 0 days.

(21) Appl. No.: 14/551,778

(22) Filed: Nov. 24, 2014

(30) Foreign Application Priority Data

Sep. 25, 2014 (TW) .............................. 103133239 A (51) Int. Cl.
*G02B 15/177* (2006.01)
*G02B 13/04* (2006.01)
*G02B 13/18* (2006.01)

(52) U.S. Cl.
CPC .............. *G02B 15/177* (2013.01); *G02B 13/04* (2013.01); *G02B 13/18* (2013.01)

(58) Field of Classification Search
CPC ...... G02B 15/15; G02B 15/16; G02B 15/177; G02B 13/009; G02B 13/0065
USPC .......................... 359/676, 678, 680–682, 689
See application file for complete search history.

(56) References Cited

U.S. PATENT DOCUMENTS

| 7,085,071 | B2 | 8/2006 | Mihara | |
|---|---|---|---|---|
| 8,218,244 | B2 | 7/2012 | Lin et al. | |
| 2007/0139787 | A1* | 6/2007 | Kim | G02B 15/177 359/680 |
| 2007/0247726 | A1* | 10/2007 | Sudoh | G02B 15/177 359/689 |
| 2012/0120501 | A1* | 5/2012 | Katayose | G02B 15/177 359/686 |

FOREIGN PATENT DOCUMENTS

| JP | 2001-343587 | 12/2001 |
|---|---|---|
| TW | I427319 | 2/2014 |

* cited by examiner

*Primary Examiner* — Darryl J Collins
(74) *Attorney, Agent, or Firm* — WPAT, PC; Justin King (57) ABSTRACT

A zoom lens includes a first lens group having negative refractive power, a second lens group having positive refractive power and a third lens group having positive refractive power. The second lens group is disposed between the first lens group and the third lens group. The second lens group includes at least an aspheric glass lens. Through using the aspheric glass lens, the imaging quality of the disclosed zoom lens is not sensitive to temperatures changes.

12 Claims, 10 Drawing Sheets

ZOOM LENS

FIELD OF THE INVENTION

The present invention relates to a lens, and more particularly to a zoom lens.

BACKGROUND OF THE INVENTION

Image capture device, such as a camera, is used to capture object-side images through camera lens and image sensing components thereof, wherein the camera lens is configured to focus light beams from object side on the image sensing components. Camera lens can be divided into prime lens and zoom lens. Because of being able to adjust a focal length, the zoom lens is more convenient to use. A good zoom lens is defined to have great imaging qualities in each focal length. Thus, it is a big challenge to a zoom lens designer to design a zoom lens having good imaging qualities in each focal length.

Moreover, it is understood that the physical characteristics of a zoom lens are related to a temperature change and accordingly the imaging qualities of the zoom lens may be affected by a temperature change. Therefore, the temperature factor must be considered when a zoom lens is being designed, thereby preventing the zoom lens from having imaging qualities varying with temperature.

SUMMARY OF THE INVENTION

One object of the present invention is to provide a zoom lens having an imaging quality not being easily affected by temperatures changes.

The present invention provides a zoom lens, which includes a first lens group having negative refractive power, a second lens group having positive refractive power, and a third lens group having positive refractive power. The second lens group is disposed between the first lens group and the third lens group. The second lens group includes at least one aspheric glass lens.

In one embodiment of the present invention, the first lens group includes a first lens, a second lens and a third lens arranged sequentially. The first lens has negative refractive power, the second lens has negative refractive power, and third lens has positive refractive power. The second lens group includes a fourth lens, a fifth lens, a sixth lens and a seventh lens arranged sequentially. The fourth lens has positive refractive power, the fifth lens has positive refractive power, the sixth lens has negative refractive power, and the seventh lens has positive refractive power. The third lens is disposed between the second lens and the fourth lens. The third lens group includes an eighth lens having positive refractive power.

In one embodiment of the present invention, the fourth lens, the fifth lens and the seventh lens are aspheric glass lenses.

In one embodiment of the present invention, the second lens includes a first surface and a second surface. The first surface faces to the first lens and the second surface faces to the third lens. A focal length of the first surface is f121, a focal length of the second surface is f122, and $1.1 \leq f121/f122 \leq 1.3$.

In one embodiment of the present invention, an effective thickness of the center of the second lens is Teff, and $10 \leq |f121/\text{Teff}| \leq 11$.

In one embodiment of the present invention, the fourth lens includes a third surface which faces to the third lens. A focal length of the third surface is f211, an effective focal length of the second lens group is FG2, and $0.7 \leq f211/FG2 \leq 0.8$.

In one embodiment of the present invention, an effective focal length from the fourth lens to the sixth lens of the second lens group is FL456, and $1.06 \leq FL456/FG2 \leq 1.12$.

In one embodiment of the present invention, the zoom lens further includes an aperture stop which is disposed between the third lens and the fourth lens.

In one embodiment of the present invention, while the zoom lens zooms from a width angle end to a telephoto end, the first lens group is fixed without a movement, the second lens group and the third lens group move away from each other, and the aperture stop moves with the second lens group. While the zoom lens zooms from the telephoto end to the width angle end, the first lens group is fixed without a movement, the second lens group and the third lens group move toward each other, and the aperture stop moves with the second lens group.

In one embodiment of the present invention, the second lens and the eighth lens are aspheric lenses.

In one embodiment of the present invention, the fourth lens, the fifth lens, the sixth lens and the seventh lens are glass lenses.

In one embodiment of the present invention, the second lens includes a first surface, a second surface and a reflective surface. The first surface faces to the first lens, the second surface faces to the third lens, and the reflective surface is disposed between the first surface and the second surface.

In summary, because the second lens group of the zoom lens of the present invention includes at least one aspheric glass lens and the refractive index of a glass aspheric lens is less sensitive to a temperature change, the zoom lens of the present invention can have qualified imaging quality under any whether condition.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
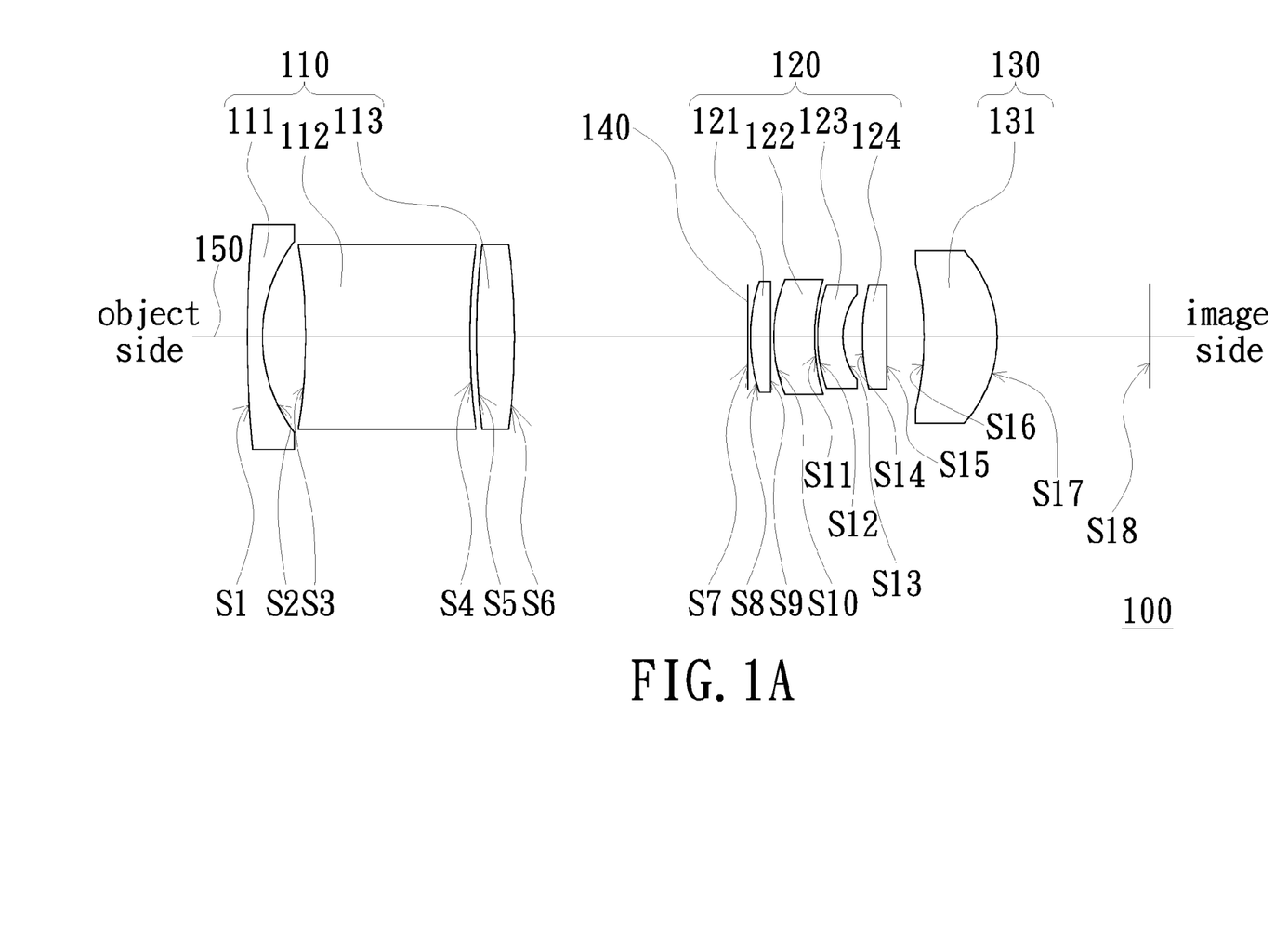
FIG. 1A is a schematic structural view of a zoom lens at a width angle end in accordance with an embodiment of the present invention.
Figure 1B:
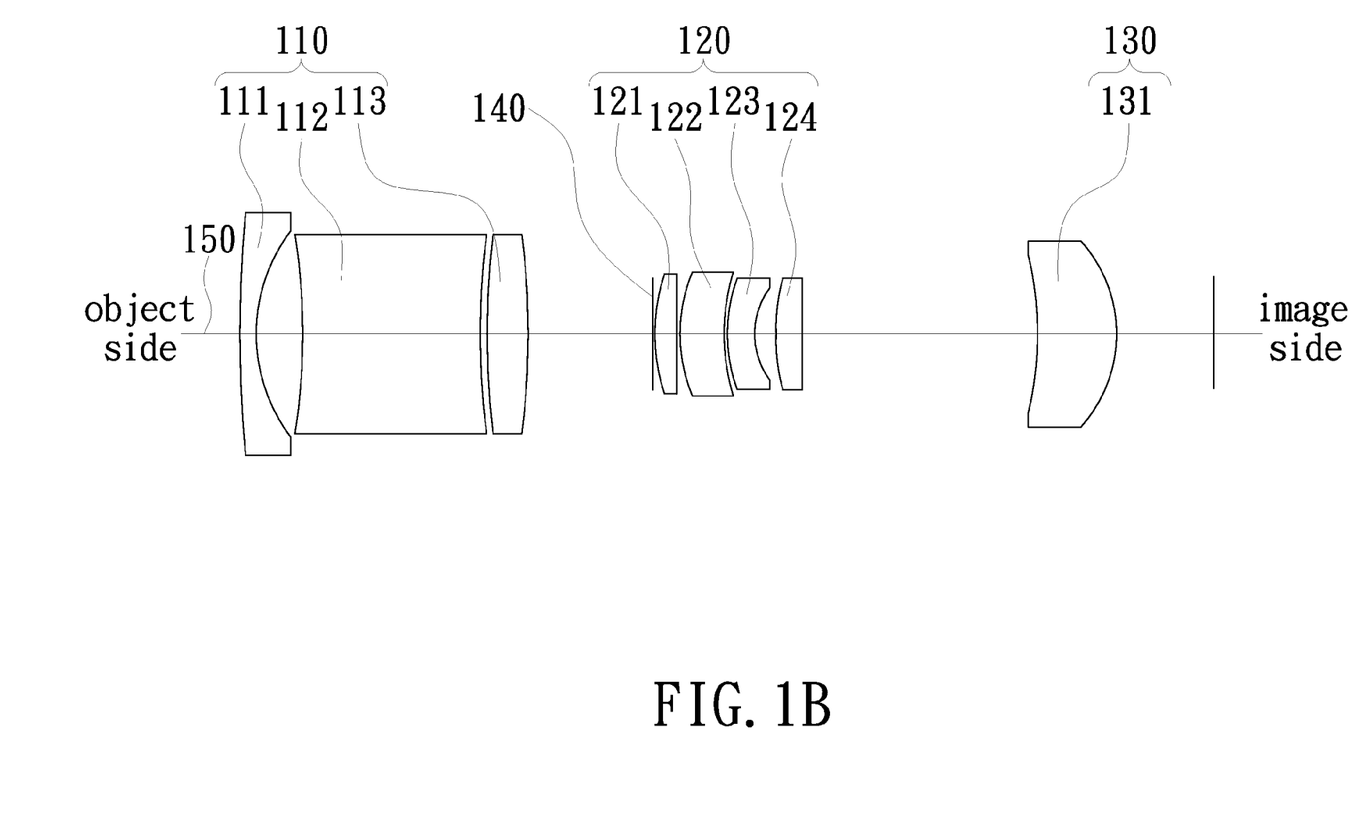
FIG. 1B is a schematic structural view of a zoom lens at a middle position in accordance with an embodiment of the present invention.
Figure 1C:
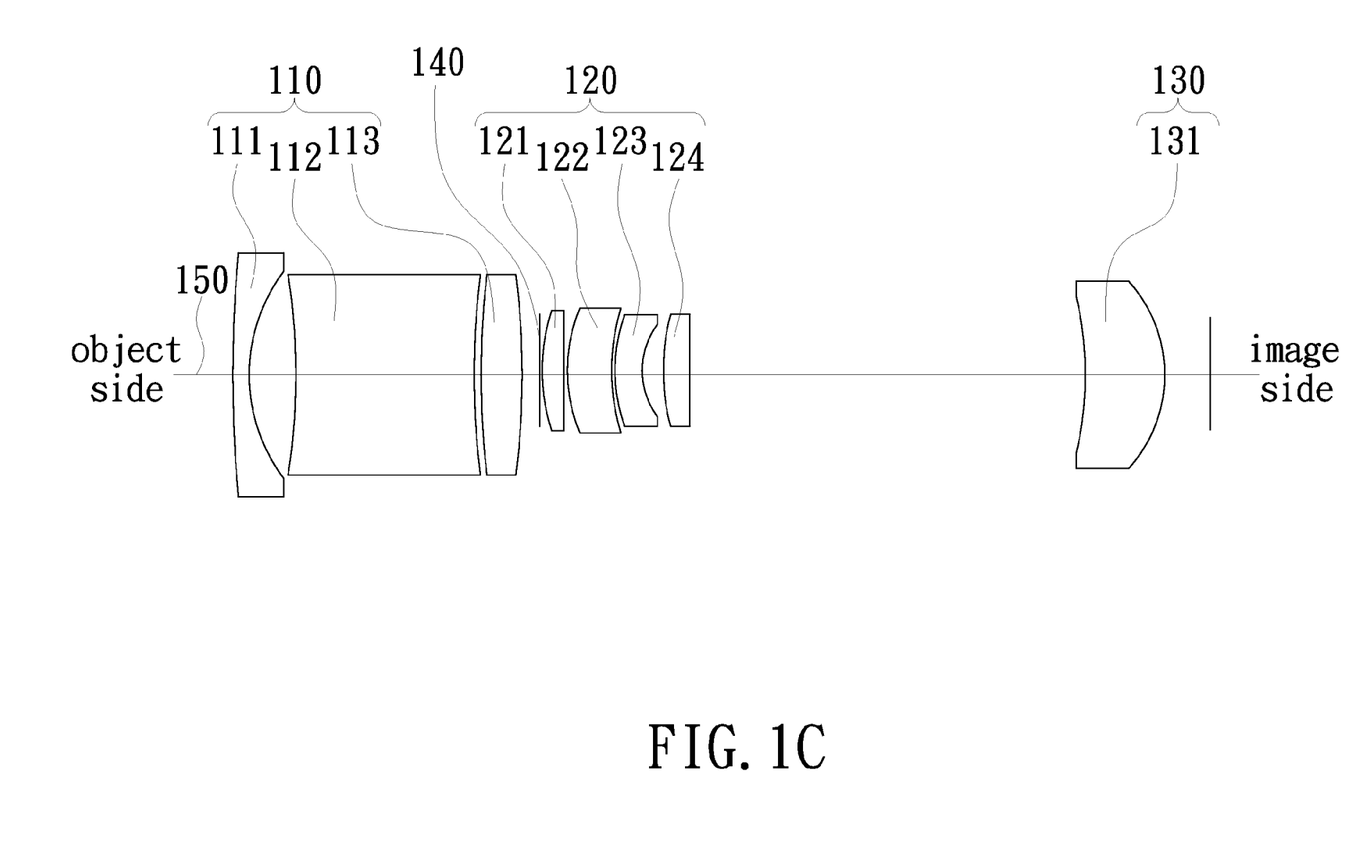
FIG. 1C is a schematic structural view of a zoom lens at a telephoto end in accordance with an embodiment of the present invention.

FIGS. 1A-1C are schematic structural views of a zoom lens at a width angle end, a middle position and a telephoto end in accordance with an embodiment of the present invention, respectively. Please refer to FIG. 1A first. The zoom lens 100 in the present embodiment includes a first lens group 110 having negative refractive power, a second lens group 120 having positive refractive power, and a third lens group 130 having positive refractive power. The second lens group 120 is disposed between the first lens group 110 and the third lens group 130, the first lens group 110 is disposed close to an object side, and the third lens group 130 is disposed close to an image side. In this embodiment, the second lens group 120 functions as a variator group and the third lens group 130 functions as a compensator group; wherein the effective focal length of the zoom lens 100 is related to the position of the second lens group 120 relative to the first lens group 110 and the refraction power of the second lens group 120. Moreover, the zoom lens 100 may further include an aperture stop 140 disposed between the first lens group 110 and the second lens group 120.

Please refer to FIGS. 1A-1C. While the zoom lens 100 zooms from the width angle end (as illustrated in FIG. 1A) to the middle position (as illustrated in FIG. 1B) or from the middle position to the telephoto end (as illustrated in FIG. 1C), the first lens group 110 is fixed without a movement, the second lens group 120 and the third lens group 130 move away from each other, and the aperture stop 140 moves with the second lens group 120. Alternatively, while the zoom lens 100 zooms from the telephoto end (as illustrated in FIG. 1C) to the middle position (as illustrated in FIG. 1B) or from the middle position to the width angle end (as illustrated in FIG. 1A), the first lens group 110 is fixed without a movement, the second lens group 120 and the third lens group 130 move toward each other, and the aperture stop 140 moves with the second lens group 120.

The first lens group 110 may include a first lens 111, a second lens 112 and a third lens 113 arranged sequentially from the object side to the image side. The first lens 111 has negative refractive power, the second lens 112 has negative refractive power, and third lens 113 has positive refractive power. The second lens group 120 may include a fourth lens 121, a fifth lens 122, a sixth lens 123 and a seventh lens 124 arranged sequentially from the object side to the image side. The fourth lens 121 has positive refractive power, the fifth lens 122 has positive refractive power, the sixth lens 123 has negative refractive power, and the seventh lens 124 has positive refractive power. The third lens 113 is disposed between the second lens 112 and the fourth lens 121. The third lens group 130 may include an eighth lens 131 having positive refractive power. The aperture stop 140 is disposed between the third lens 113 and the fourth lens 121, and is, for instance, close to the fourth lens 121.

The related parameters of the zoom lens 100 in one embodiment will be described as follow; however, it is understood that these parameter values are provided for an exemplary purpose only and the present invention is not limited thereto. In other words, these parameter values are merely examples, which should not unduly limit the scope of the claims. One of ordinary skill in the art would recognize many variations, alternatives, and modifications.

TABLE 1

|  | Focal Length (mm) | refractive power |
|---|---|---|
| First lens | −6.88 | −0.15 |
| Second lens | −14.86 | −0.07 |
| Third lens | 13.63 | 0.07 |
| First lens group | −9.85 | −0.10 |
| Fourth lens | 6.96 | 0.14 |
| Fifth lens | 14.70 | 0.07 |
| Sixth lens | −5.26 | −0.19 |
| Seventh lens | 44.03 | 0.02 |
| Second lens group | 8.82 | 0.11 |
| Eighth lens | 10.97 | 0.09 |
| Third lens group | 10.97 | 0.09 |

TABLE 2

| Surface | Radius of curvature (mm) | Interval (mm) | Refractive index | Abbe number |
|---|---|---|---|---|
| S1 | 58.09 | 0.4 | 1.8 | 43 |
| S2 | 5.21 | 1.34 | | |
| S3 | −18.1 | 5.06 | 1.5 | 56 |
| S4 | 15.36 | 0.2 | | |
| S5 | 22.8 | 1.18 | 1.9 | 24 |
| S6 | −22.8 | variable interval A | | |
| S7 | infinity | 0.08 | | |
| S8 | 4.12 | 0.63 | 1.6 | 57 |
| S9 | 153.4 | 0.08 | | |
| S10 | 6.29 | 1.28 | 1.6 | 57 |
| S11 | 19.68 | 0.08 | | |
| S12 | 5.43 | 0.72 | 1.9 | 19 |
| S13 | 2.4 | 0.68 | | |
| S14 | −56.21 | 0.68 | 1.6 | 57 |
| S15 | −18.21 | variable interval B | | |
| S16 | −18.25 | 2.2 | 1.5 | 56 |
| S17 | −4.6 | variable interval C | | |

TABLE 3

|  | Width angle end | Middle position | Telephoto end |
|---|---|---|---|
| Focal length (mm) | 3.6 | 6.2 | 9.9 |
| F-number | 3 | 4.4 | 6.1 |
| Field of view | 66° | 39° | 25° |

As shown in FIGS. 1A-1C, the surfaces S1 and S2 are two surfaces of the first lenses 111. The surfaces S3 and S4 are two surfaces of the second lenses 112. The surfaces S5 and S6 are two surfaces of the third lens 113. The surface S7 is the aperture stop 140. The surfaces S8 and S9 are two surfaces of the fourth lens 121. The surfaces S10 and S11 are two surfaces of the fifth lens 122. The surfaces S12 and S13 are two surfaces of the sixth lens 123. The surfaces S14 and S15 are two surfaces of the seventh lens 124. The surfaces S16 and S17 are two surfaces of the eighth lens 131. The "Interval" in Table 2 denotes the straight line distance between one surface and its respective adjacent surface on the optical axis 150 of the zoom lens 100. For example, the interval of the surface S1 denotes a straight line distance between the surface S1 and the surface S2 on the optical axis 150. The interval of the surface S17 denotes a straight line distance between the surface S17 and an imaging surface S18 on the optical axis 150.

In Table 2, the surfaces S6, S15 and S17 have variable intervals. Please refer to Table 4 for the specific values of the variable intervals of the surfaces S6, S15 and S17.

TABLE 4

|  | Width angle end | Middle position | Telephoto end |
|---|---|---|---|
| variable interval A (min) | 7.22 | 3.58 | 0.55 |
| variable interval B (min) | 1.2 | 6.77 | 11.2 |
| variable interval C (min) | 4.56 | 2.63 | 1.21 |

In this embodiment, the material of the second lens group 120 is, for instance, glass and the second lens group 120 includes at least one aspheric glass lens. In one embodiment, for example, the fourth lens 121, the fifth lens 122, the sixth lens 123 and the seventh lens 124 are glass lenses; wherein the fourth lens 121, the fifth lens 122 and the seventh lens 124 are aspheric glass lenses. However, it is to be noted that the present invention is not limited to the amount of aspheric glass lenses in the second lens group 120. Through implementing the lens 121, the fifth lens 122, the sixth lens 123 and the seventh lens 124 with glass lenses, the impact degree of the temperature change on the imaging position of the zoom lens 100 is effectively reduced due to that the coefficient of linear thermal expansion of common plastic materials is several times higher than that of glass materials thereby causing the change of the radius of curvature of the common plastic materials is several times higher than that of glass materials with the temperature change, the index of refraction of glass aspheric lens is less sensitive to temperature change, and the second lens group 120 functioning as variator group is an important factor for an imaging position of the zoom lens 100. Therefore, the zoom lens 100 in this embodiment is adapted to all kinds of weather conditions and has qualified imaging qualities without being easily affected by temperature changes.

In the zoom lens 100 of this embodiment, the surface S3 of the second lens 112 faces to the first lens 111 and the surface S4 faces to the third lens 112. The focal length of the surface S3 is f121 and the focal length of the surface S4 is f122. To make the second lens 112 have specific shape and qualified refractive power, the focal lengths f121, f122 may be limited to 1.1≤f121/f122≤1.3 in one embodiment. Furthermore, to make the zoom lens 100 have proper overall thickness, the effective thickness of the center of the second lens 112 is Teff and the effective thickness Teff may be limited to 10≤|f121/Teff|≤11.

In this embodiment, the surface S8 of the fourth lens 121 faces to the third lens 113. The focal length of the surface S8 is f211. The effective focal length of the second lens group 120 is FG2. To make the fourth lens 113 have qualified refractive power, the focal length f211 and the effective focal length FG2 may be limited to 0.7≤f211/FG2≤0.8. The effective focal length from the fourth lens 121 to the sixth lens 123 is FL456. To make the lens in the second lens group 120 have qualified combined refractive power, the effective focal length FL456 may be limited to 1.06≤FL456/FG2≤1.12.

Furthermore, besides the fourth lens 121, the fifth lens 122 and the seventh lens 124 are aspheric glass lenses, the first lens group 110 and the third lens group 130 each may include one aspheric glass lens in one embodiment. For example, as shown in Table 5, the second lens 112 and the eighth lens 131 are aspheric lenses, which may be made of glass or plastic. The shapes of the surfaces S3 and S4 of the second lens 112, the surfaces S8 and S9 of the fourth lens 121, the surfaces S10 and S11 of the fifth lens 122, the surfaces S14 and S15 of the seventh lens 124 and the surfaces S16 and S17 of the eighth lens 131 satisfy the following aspheric equation:

$$Z = \frac{(h^2/r)}{1+\sqrt{1-(1+k)(h^2/r^2)}} + C_2 h^2 + C_4 h^4 + C_6 h^6 + C_8 h^8 + C_{10} h^{10} + C_{12} h^{12} + C_{14} h^{14} + C_{16} h^{16} \ldots$$

where Z(h) denotes the sag in the direction of the optical axis 150, r denotes the radius of curvature close to the optical axis 150 (as shown in Table 2), k denotes a conic constant, h denotes an aspheric height (the distance from the center to the edge of the lens), each one of $C_2$, $C_4$, $C_6$, $C_8$, $C_{10}$, $C_{12}$, $C_{14}$, $C_{16}$ . . . denotes an aspheric coefficient. Please refer to Table 5 for the detailed parameter values.

TABLE 5

| surface | k | $C_2$ | $C_4$ | $C_6$ | $C_8$ | $C_{10}$ | $C_{12}$ | $C_{14}$ | $C_{16}$ |
|---|---|---|---|---|---|---|---|---|---|
| S3 | −14.79 | 0 | −3.84E−04 | −5.83E−05 | 1.61E−05 | −5.08E−07 | −2.37E−07 | 3.11E−08 | −1.17E−09 |
| S4 | 16.15 | 0 | −9.22E−04 | −1.31E−04 | 4.89E−05 | −1.02E−05 | 1.09E−06 | −5.63E−08 | 9.69E−10 |
| S8 | −0.92 | 0 | −6.62E−03 | 1.01E−03 | −2.70E−03 | 8.51E−04 | 1.28E−04 | −8.54E−05 | 1.17E−05 |
| S9 | 477.3 | 0 | −0.02 | 1.91E−04 | 5.51E−04 | 2.13E−04 | 5.59E−05 | −4.61E−05 | 8.05E−06 |
| S10 | 0 | 0 | −4.30E−03 | 8.19E−04 | 1.05E−03 | 6.51E−04 | −3.69E−04 | 6.46E−05 | −4.39E−06 |
| S11 | 0 | 0 | 0.02 | −5.35E−04 | 2.79E−04 | −4.57E−04 | 4.67E−04 | −1.34E−04 | 1.01E−05 |
| S14 | 0 | 0 | 0.03 | 3.12E−03 | −4.54E−03 | 3.35E−03 | −1.18E−03 | 2.07E−04 | −1.33E−05 |
| S15 | 0 | 0 | 0.01 | 8.36E−04 | −1.15E−03 | 3.45E−04 | 2.00E−04 | −1.31E−04 | 2.35E−05 |
| S16 | 52.31 | 0 | −3.48E−03 | −7.39E−05 | −7.29E−05 | −1.85E−05 | 1.59E−05 | −3.51E−06 | 2.53E−07 |
| S17 | 1.2 | 0 | −3.68E−05 | −2.76E−04 | 1.85E−04 | −6.49E−05 | 1.29E−05 | −1.31E−06 | 5.40E−08 |

The optical simulation results obtained by the zoom lens 100 zooming to the width angle end, the middle position and the telephoto end will be described as follow.

Figure 2A:
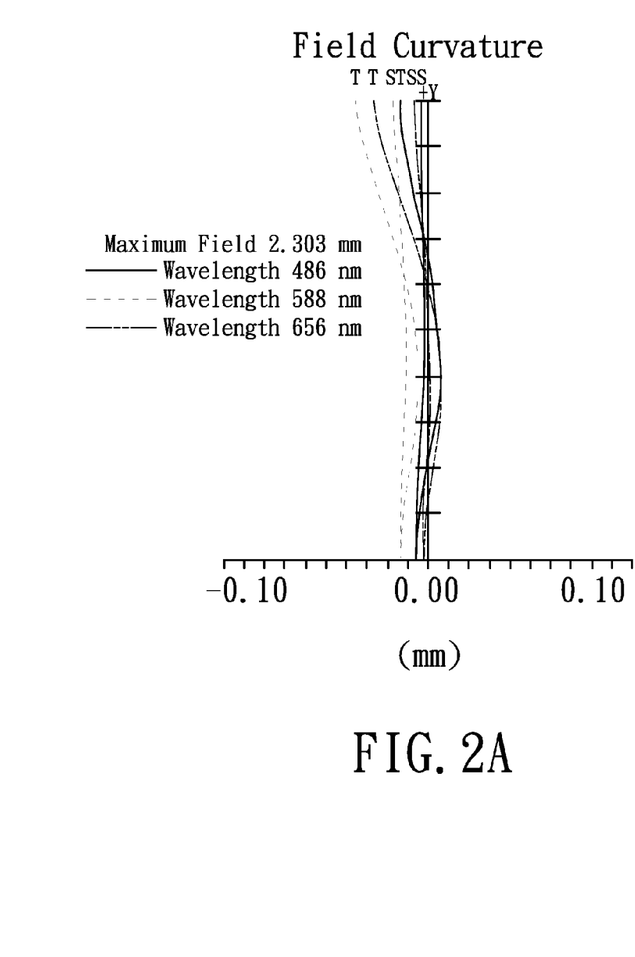
FIG. 2A is a field curvature diagram of a zoom lens zooming to a width angle end in accordance with an embodiment of the present invention.
Figure 2B:
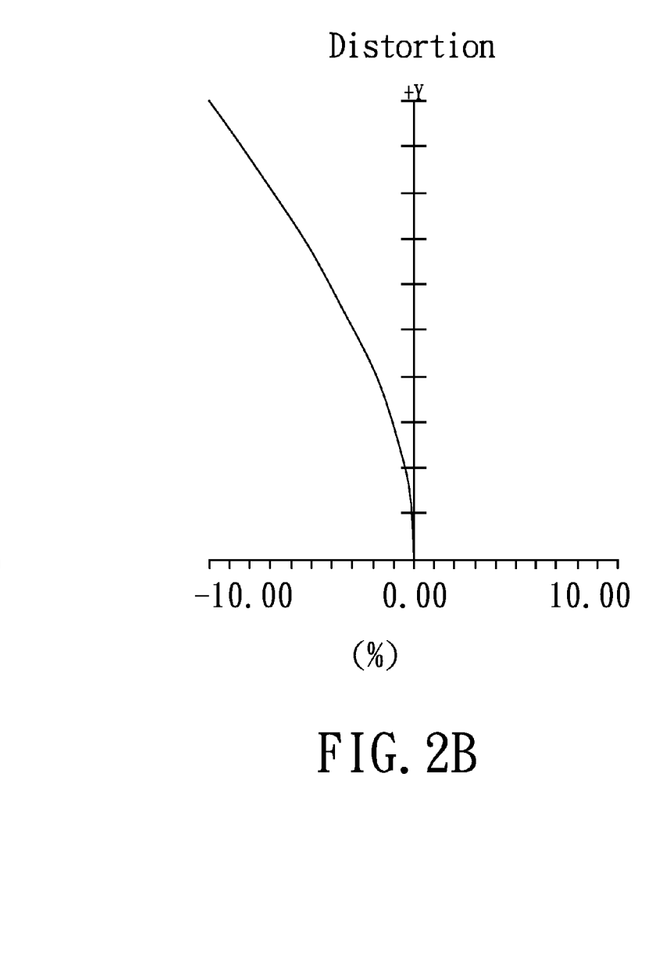
FIG. 2B is a distortion diagram of a zoom lens zooming to a width angle end in accordance with an embodiment of the present invention.
Figure 2C:
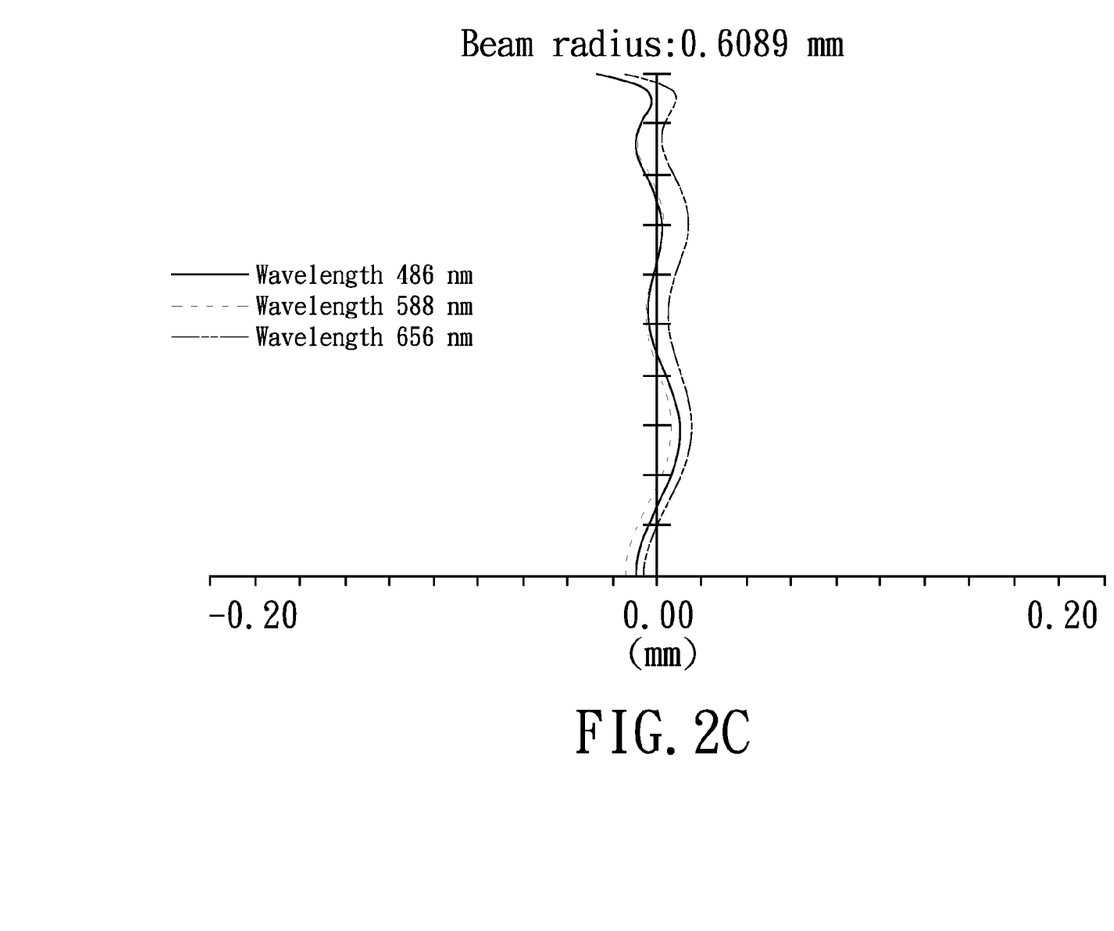
FIG. 2C is a longitudinal aberration diagram of a zoom lens zooming to a width angle end in accordance with an embodiment of the present invention.
Figure 3A:
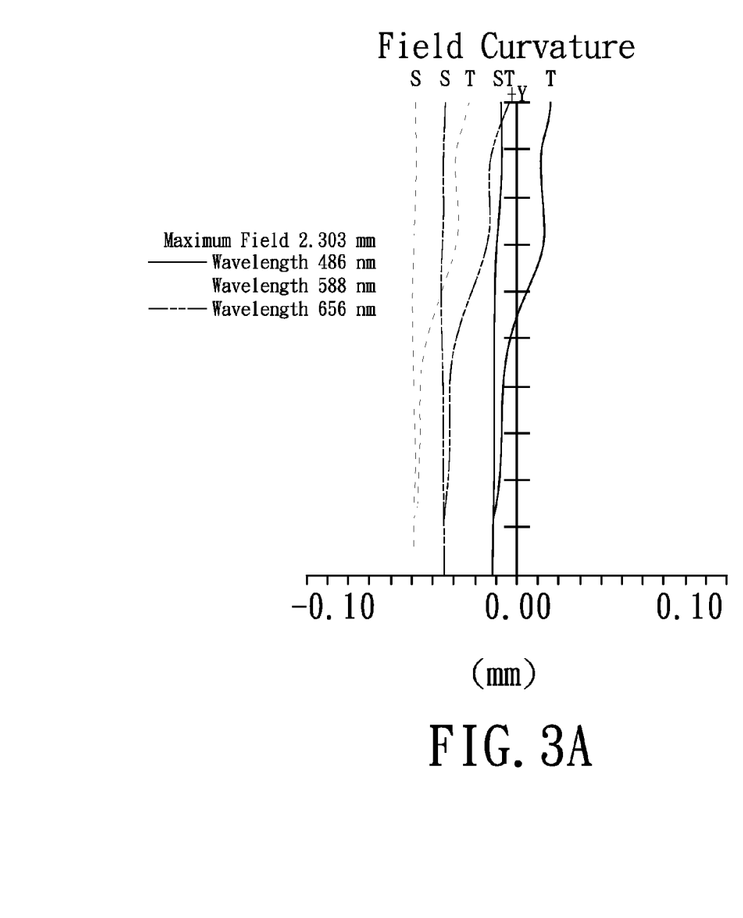
FIG. 3A is a field curvature diagram of a zoom lens zooming at a middle position in accordance with an embodiment of the present invention.
Figure 3B:
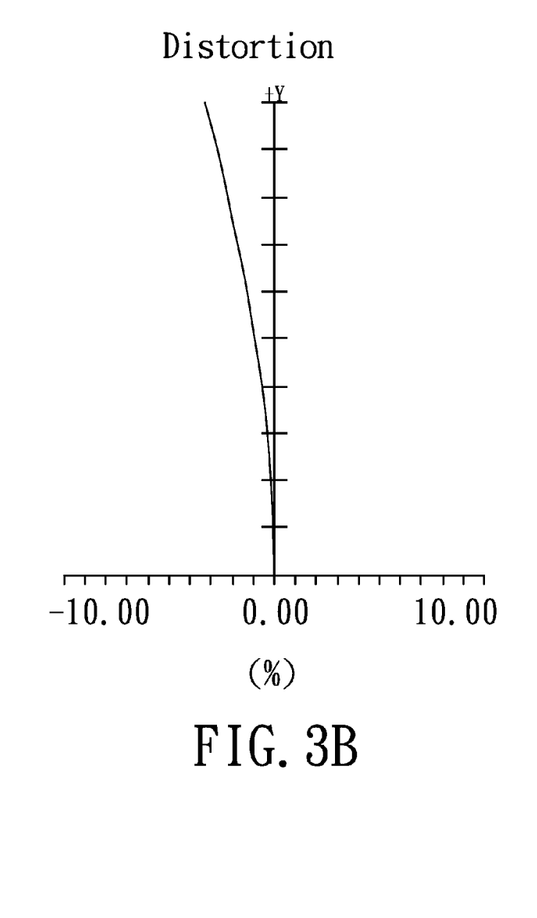
FIG. 3B is a distortion diagram of a zoom lens zooming at a middle position in accordance with an embodiment of the present invention.
Figure 3C:
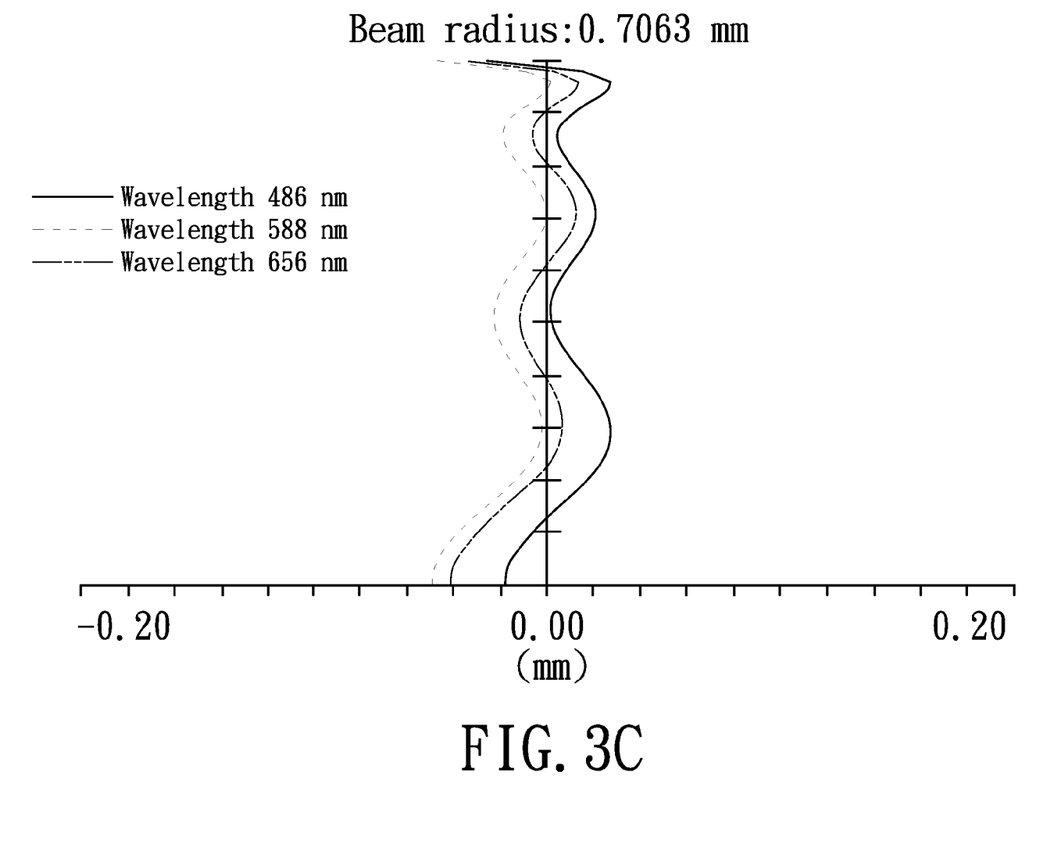
FIG. 3C is a longitudinal aberration diagram of a zoom zooming lens at a middle position in accordance with an embodiment of the present invention.
Figure 4A:
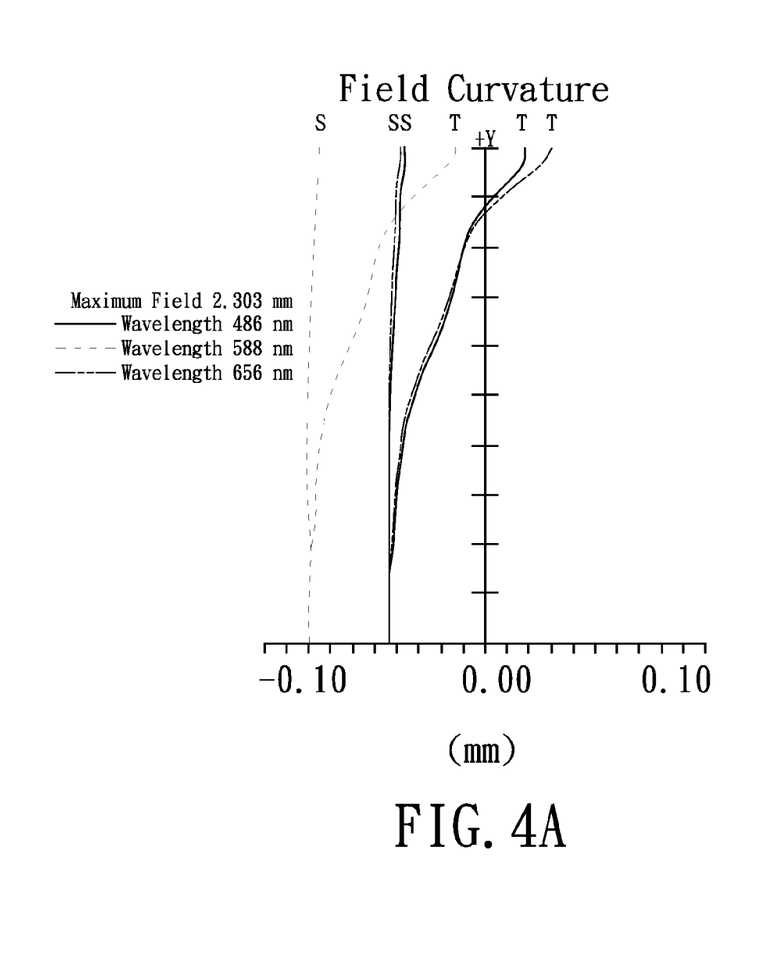
FIG. 4A is a field curvature diagram of a zoom lens zooming to a telephoto end in accordance with an embodiment of the present invention.
Figure 4B:
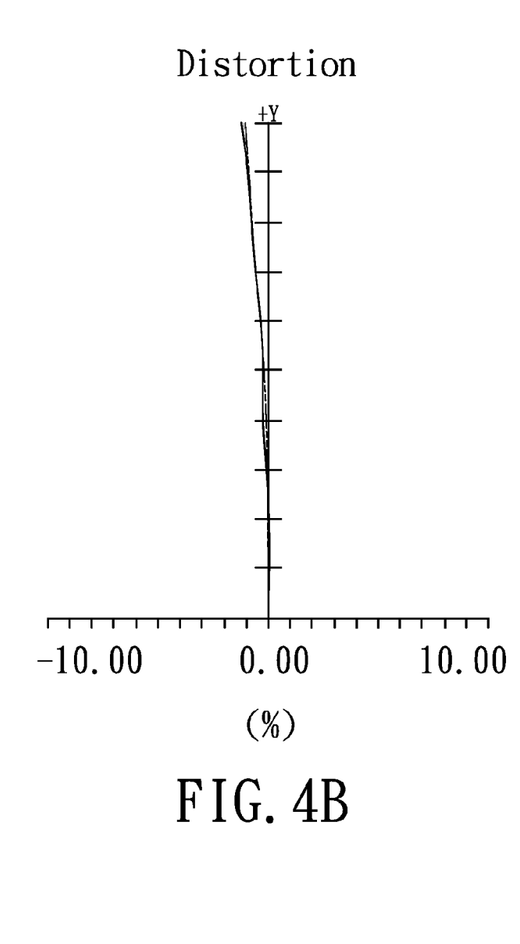
FIG. 4B is a distortion diagram of a zoom lens zooming to a telephoto end in accordance with an embodiment of the present invention.
Figure 4C:
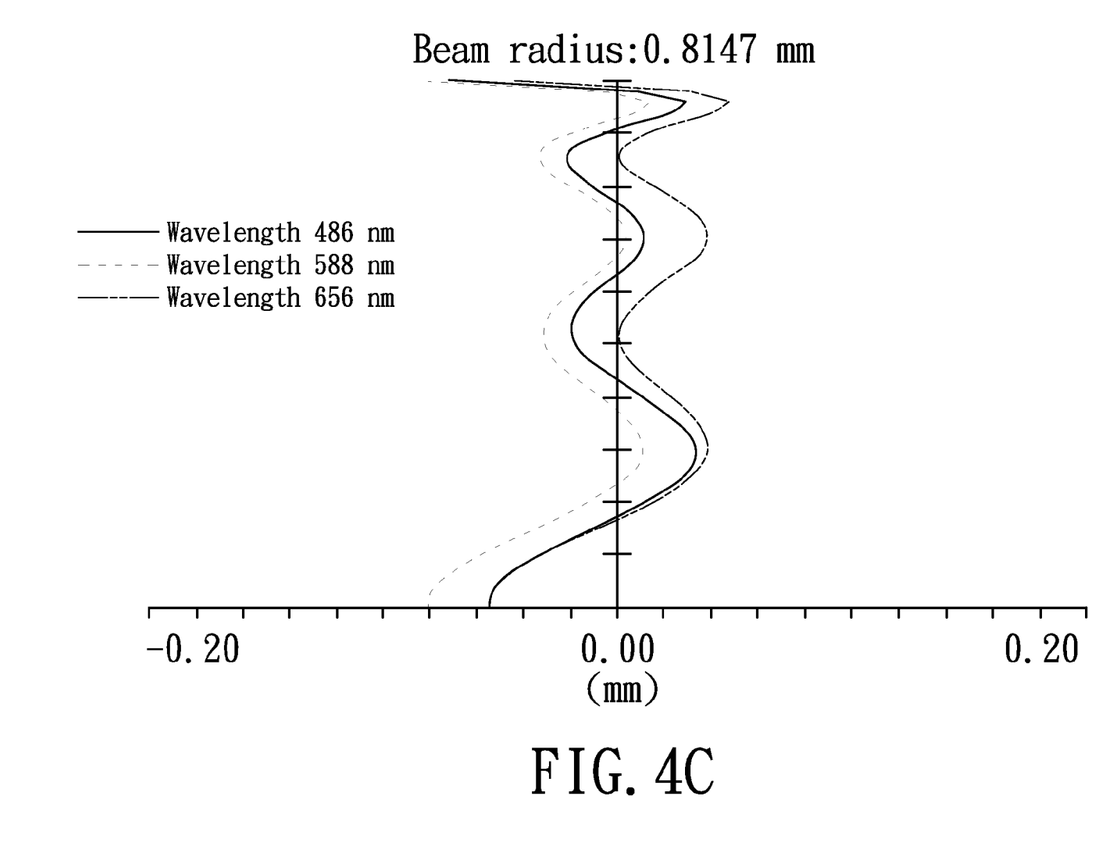
FIG. 4C is a longitudinal aberration diagram of a zoom lens zooming to a telephoto end in accordance with an embodiment of the present invention.

FIGS. 2A, 2B and 2C are field curvature, distortion and longitudinal aberration diagrams of a zoom lens zooming to a width angle end in accordance with an embodiment of the present invention, respectively. FIGS. 3A, 3B and 3C are field curvature, distortion and longitudinal aberration diagrams of a zoom lens zooming to a middle position in accordance with an embodiment of the present invention, respectively. FIGS. 4A, 4B and 4C are field curvature, distortion and longitudinal aberration diagrams of a zoom lens zooming to a telephoto end in accordance with an embodiment of the present invention, respectively. As shown in FIGS. 2A to 4C, all the obtained curve lines are within a standard range, thus, the zoom lens 100 in this embodiment can have good imaging quality.

Figure 5:
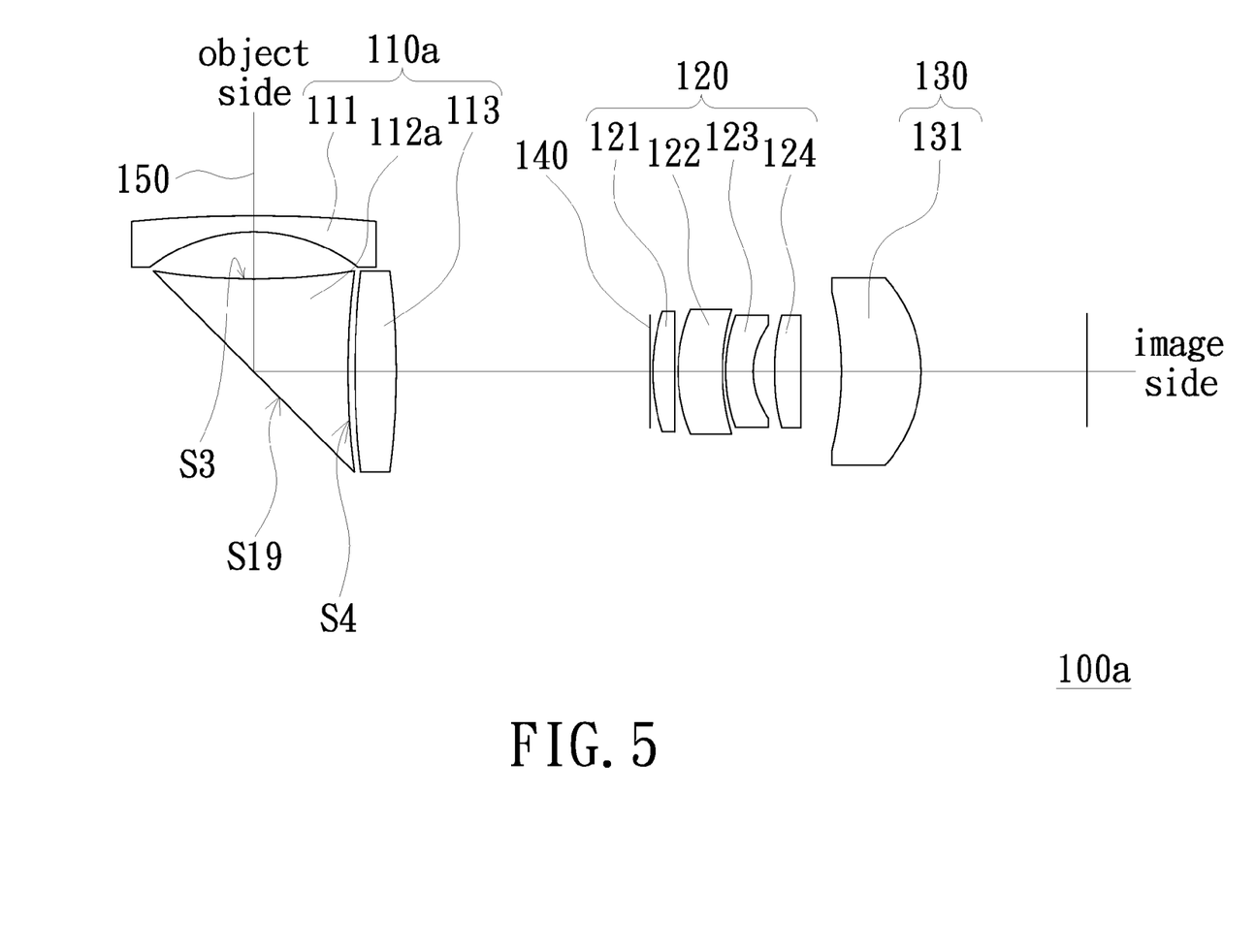
FIG. 5 is a schematic structural view of a zoom lens at a width angle end in accordance with an embodiment of the present invention.

FIG. 5 is a schematic structural view of a zoom lens at a width angle end in accordance with an embodiment of the present invention. Please refer to FIG. 5. The zoom lens 100a in this embodiment can function as a periscope zoom lens and has structure and advantages similar to that of the aforementioned zoom lens 100; thus, only the main difference between the zoom lens 100a and the zoom lens 100 will be described as follow. In the zoom lens 100a of this embodiment, the second lens 112a of the first lens group 110a includes the surfaces S3, S4 and a reflective surface S19. Specifically, the surface S3 faces to the first lens 111, the surface S4 faces to the third lens 113, and the reflective surface S19 is disposed between the surfaces S3 and S4. The reflective surface S19 is configured to change the light path, so that the zoom lens 100a can function as a periscope zoom lens. In one embodiment, the angle between the reflective surface S19 and the optical axis 150 passing through the first lens 110 is, for instance, 45 degrees; so that the optical axis 150 can have a 90-degree turn via the reflective surface S19. However, the angle between the reflective surface S19 and the optical axis 150 passing through the first lens 110 is adjustable and can be adjusted in response to the actual requirements, and the present invention is not limited thereto. Moreover, it is understood that the parameter values in the above Tables 1 to 5 can be also applied to the zoom lens 100a in this embodiment; wherein the distance between the surfaces S3 and S4 in Table 1 is referred to the straight line distance between the surface S3 and the reflective surface S19 on the optical axis 150 pulsing the straight line distance between the reflective surface S19 and the surface S4 on the optical axis 150, as illustrated in FIG. 5.

In summary, the zoom lens of the present invention has three lens groups. Specifically, while zooming, the first lens group is fixed without a movement, the second and third lens groups move either away from or toward each other, and the aperture stop moves with the second group lens. Because the second lens group includes at least one aspheric glass lens, the zoom lens of the present invention has improved imaging quality due to that the refractive index of a glass lens is less sensitive to temperature changes.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A zoom lens, comprising:
a first lens group having negative refractive power;
a second lens group having positive refractive power; and
a third lens group having positive refractive power,
wherein the second lens group is disposed between the first lens group and the third lens group,
wherein the second lens group comprises at least one aspheric glass lens,
wherein the first lens group comprises a first lens, a second lens and a third lens arranged sequentially, the first lens has negative refractive power, the second lens has negative refractive power, and the third lens has positive refractive power, wherein the second lens group comprises a fourth lens, a fifth lens, a sixth lens and a seventh lens arranged sequentially, the fourth lens has positive refractive power, the fifth lens has positive refractive power, the sixth lens has negative refractive power, and the seventh lens has positive refractive power, wherein the third lens is disposed between the second lens and the fourth lens, wherein the third lens group comprises an eighth lens having positive refractive power,
wherein the second lens comprises a first surface and a second surface, the first surface faces to the first lens and the second surface faces to the third lens, a focal length of the first surface is f121, a focal length of the second surface is f122, and $1.1 \leq f121/f122 \leq 1.3$,
wherein an effective thickness of the center of the second lens is Teff, and $10 \leq |f121/Teff| \leq 11$.

2. The zoom lens according to claim 1, wherein the fourth lens, the fifth lens and the seventh lens are aspheric glass lenses.

3. The zoom lens according to claim 1, wherein the fourth lens comprises a third surface, the third surface faces to the third lens, a focal length of the third surface is f211, an effective focal length of the second lens group is FG2, and $0.7 \leq f211/FG2 \leq 0.8$.

4. The zoom lens according to claim 3, wherein an effective focal length from the fourth lens to the sixth lens of the second lens group is FL456, and $1.06 \leq FL456/FG2 \leq 1.12$.

5. The zoom lens according to claim 1, further comprising an aperture stop disposed between the third lens and the fourth lens.

6. The zoom lens according to claim 5, wherein while the zoom lens zooms from a width angle end to a telephoto end, the first lens group is fixed without a movement, the second lens group and the third lens group move away from each other, and the aperture stop moves with the second lens group; wherein while the zoom lens zooms from the telephoto end to the width angle end, the first lens group is fixed without a movement, the second lens group and the third lens group move toward each other, and the aperture stop moves with the second lens group.

7. The zoom lens according to claim 1, wherein the second lens and the eighth lens are aspheric lenses.

8. The zoom lens according to claim 1, wherein the fourth lens, the fifth lens, the sixth lens and the seventh lens are glass lenses.

9. The zoom lens according to claim 1, wherein the second lens comprises a first surface, a second surface and a reflective surface, the first surface faces to the first lens, the second surface faces to the third lens, and the reflective surface is disposed between the first surface and the second surface.

10. A zoom lens, comprising:
a first lens group having negative refractive power;
a second lens group having positive refractive power; and
a third lens group having positive refractive power,
wherein the second lens group is disposed between the first lens group and the third lens group,
wherein the second lens group comprises at least one aspheric glass lens,
wherein the first lens group comprises a first lens, a second lens and a third lens arranged sequentially, the first lens has negative refractive power, the second lens has negative refractive power, and the third lens has positive refractive power, wherein the second lens group comprises a fourth lens, a fifth lens, a sixth lens and a seventh lens arranged sequentially, the fourth lens has positive refractive power, the fifth lens has positive refractive power, the sixth lens has negative refractive power, and the seventh lens has positive refractive power, wherein the third lens is disposed between the second lens and the fourth lens, wherein the third lens group comprises an eighth lens having positive refractive power, wherein the fourth lens comprises a third surface, the third surface faces to the third lens, a focal length of the third surface is f211, an effective focal length of the second lens group is FG2, and $0.7 \leq f211/FG2 \leq 0.8$.

11. The zoom lens according to claim 10, wherein an effective focal length from the fourth lens to the sixth lens of the second lens group is FL456, and $1.06 \leq L456/FG2 \leq 1.12$.

12. A zoom lens, comprising:
a first lens group having negative refractive power;
a second lens group having positive refractive power; and
a third lens group having positive refractive power,
wherein the second lens group is disposed between the first lens group and the third lens group,
wherein the second lens group comprises at least one aspheric glass lens,
wherein the first lens group comprises a first lens, a second lens and a third lens arranged sequentially, the first lens has negative refractive power, the second lens has negative refractive power, and the third lens has positive refractive power, wherein the second lens group comprises a fourth lens, a fifth lens, a sixth lens and a seventh lens arranged sequentially, the fourth lens has positive refractive power, the fifth lens has positive refractive power, the sixth lens has negative refractive power, and the seventh lens has positive refractive power, wherein the third lens is disposed between the second lens and the fourth lens, wherein the third lens group comprises an eighth lens having positive refractive power,
wherein the second lens comprises a first surface, a second surface and a reflective surface, the first surface faces to the first lens, the second surface faces to the third lens, and the reflective surface is disposed between the first surface and the second surface.

* * * * *